(12) United States Patent
Kobayashi et al.

(10) Patent No.: US 7,573,520 B2
(45) Date of Patent: *Aug. 11, 2009

(54) SOLID STATE IMAGING APPARATUS AND A DRIVING METHOD OF THE SOLID STATE IMAGING APPARATUS

(75) Inventors: Makoto Kobayashi, Miyagi (JP);
Katsumi Ikeda, Miyagi (JP)

(73) Assignee: Fujifilm Corp., Tokyo (JP)

( * ) Notice: Subject to any disclaimer, the term of this patent is extended or adjusted under 35 U.S.C. 154(b) by 436 days.

This patent is subject to a terminal disclaimer.

(21) Appl. No.: 11/434,233

(22) Filed: May 16, 2006

(65) Prior Publication Data
US 2006/0268139 A1 Nov. 30, 2006

(30) Foreign Application Priority Data
May 17, 2005 (JP) ............................. 2005-144589

(51) Int. Cl.
*H04N 5/335* (2006.01)
(52) U.S. Cl. ...................... 348/311; 348/302; 348/272; 348/281; 348/282; 348/294
(58) Field of Classification Search ................. 348/302, 348/272, 281, 282, 294, 311
See application file for complete search history.

(56) References Cited

U.S. PATENT DOCUMENTS 6,774,350 B2 * 8/2004 Okada .................... 250/208.1

7,352,454 B2 * 4/2008 Bamji et al. ............. 356/141.1
2001/0055832 A1 * 12/2001 Schmitz et al. ............... 438/57
2003/0025816 A1 * 2/2003 Sakuragi ..................... 348/301

FOREIGN PATENT DOCUMENTS

JP      10-136391 A    * 5/1998

OTHER PUBLICATIONS

Yamada et al, Digest of Technical Papers, 2000 IEEE International Solid-State Circuits Conference, Feb. 2000, pp. 110-111, First Edition, John H. Wuorinen, Castine, Maine.

* cited by examiner

*Primary Examiner*—Tuan V Ho
*Assistant Examiner*—Quang V Le
(74) *Attorney, Agent, or Firm*—Birch, Stewart, Kolasch & Birch, LLP

(57) ABSTRACT

A first voltage is impressed to a reading out electrode for reading out accumulated signal electric charges from photo electric conversion elements to transfer channels in a reading out period and at a same time during the reading out period a second voltage is imposed to at least one of the transfer electrodes adjoining to the reading out electrode for each photo electric conversion element for accumulating the signal electric charge in the vertical electric charge transfer channel under the one of the transfer electrode in a first mode for outputting signal electric charges independently, and only the first voltage is imposed only to the reading out electrode for reading out the accumulated signal electric charge from the photo electric conversion elements to the transfer channels in a reading out period in the second mode for adding the signal electric charges.

6 Claims, 11 Drawing Sheets

SOLID STATE IMAGING APPARATUS AND A DRIVING METHOD OF THE SOLID STATE IMAGING APPARATUS

CROSS REFERENCE TO RELATED APPLICATION

This application is based on Japanese Patent Application 2005-144589, filed on May 17, 2005, the entire contents of which are incorporated herein by reference.

BACKGROUND OF THE INVENTION

A) Field of the Invention

This invention relates to a solid state imaging apparatus, and more in detail, relates to a driving method of the solid state imaging apparatus.

B) Description of the Related Art

FIG. 10 is a schematic plan view showing a conventional solid-state imaging apparatus 51.

The solid-state imaging apparatus 51 is consisted of a light-receiving region 62 including a plurality of photoelectric conversion elements 52 and a vertical signal electric charge transfer device (a vertical charge coupled device: VCCD) transferring the signal electric charges generated by the photoelectric conversion elements 52, a horizontal signal electric charge transfer device (a horizontal charge coupled device: HCCD) 73 transferring the signal electric charges transferred by the VCCD 54 to a horizontal direction and an output amplifier 74.

The light-receiving region 62 in the imaging device adopting the pixel interleaved array CCD (PIACCD) as shown in the drawing is consisted of the plurality of the photoelectric conversion elements that are configured in a pixel interleaved arrangement. Between each row of the photoelectric conversion elements, a vertical electric charge transfer device 64 which reads the signal electric charges generated by the photoelectric conversion elements 52 and transfers them to a vertical direction are arranged by traversing in the spaces among the photoelectric conversion elements 52 in the vertical direction. Transfer channels are positioned in the zigzag spaces formed by the pixel interleaved arrangement, and the adjacent transfer channels apart from each other via the photoelectric conversion elements and come closer to each other via the channel stop region 53. For example, the details of the pixel interleaved arrangement can be found in Japanese Laid-Open Patent Hei 10-136391 and Tetsuo Yamada, et al, February, 2000, "A Progressive Scan CCD Imager for DSC Applications", ISSCC Digest of Technical Papers, Page 110 to 111.

The vertical electric charge transfer device 64 is consisted of the vertical transfer channel 54 shown in FIG. 11A and in FIG. 11B and transfer electrodes 16a and 16b which are formed over the vertical transfer channel 54 via an insulating film 10a and wobbling the photoelectric conversion elements 52 to the horizontal direction.

FIG. 11A is an enlarged plan view showing a part of the light receiving region 52 in the conventional solid-state imaging apparatus 51. FIG. 9B is an enlarged cross sectional view showing the conventional solid-state imaging apparatus 51 cut across a broken line A-B in FIG. 11A.

Each of the vertical transfer channel 54 is formed corresponding to each row of the photoelectric conversion elements 52, and transfers the signal electric charges read out via a reading-out gate channel region 51c formed adjoining to each photoelectric conversion element 52 to the vertical direction. A channel stop region 53 is positioned adjoining to the vertical transfer channel 54 on the opposite side of the reading-out gate channel region 51c. Moreover, the transfer electrodes 56 (the first layer poly-silicon electrode 56a and the second layer poly-silicon 56b) are formed over the vertical transfer channel 54 via the insulating film 60a. Furthermore, at the cross section of this part, only the second layer poly-silicon electrode 56b is positioned over the vertical transfer channel 54. Further, the conventional solid-state imaging apparatus 51 has a structure wherein the two vertical transfer channels 54 are adjoining via the channel stop regions 53.

During a reading-out period, the signal charges generated by the photoelectric conversion elements (pixel) 52 are read out to the vertical transfer channels by imposing a high level voltage (VH) to the first layer poly-silicon electrode 56b ($\phi$V1) or 56d ($\phi$V3) equipped on the reading-out gate channel region (reading-out part) 51c.

Thereafter, during a transfer period, the signal charges are transferred to the HCCD 73 by sequentially imposing a mid-level pulse (VM) or a low-level pulse (VL) to the transfer electrodes 56a to 56d. A horizontal transfer of the electric charges by the HCCD 73 is executed by the two-phase drive with HM/HL pulses during a period between the transfer operations of the VCCD 64 in the transfer period.

FIG. 12 shows electric potentials between a broken line E-F in FIG. 9B. An overflow drain that discharges an excessive signal electric charge of the photoelectric conversion elements 52 is formed by adding an inverse bias on an n-type substrate 51a to form an appropriate electric potential barrier between the photoelectric conversion element 52 and the n-type substrate 51a.

In the drawing, the electric potential indicated with a solid line is in a condition that the electric charges are accumulated in the photoelectric conversion element 52. Since a low voltage (VM or VL) is imposed on the electrode 56b, a reading part 51c is closed, and the accumulated signal charges are not read out to the vertical transfer channel 54.

In the drawing, the electric potential indicated with a dashed line is in a condition that a high voltage (VH) is imposed on the electrode 56b, and the electric potential barrier to the vertical transfer channel 54 from the photoelectric conversion elements 52 is eliminated by imposing a sufficient high voltage, and all the electric charges will move to the vertical transfer channel 54. Moreover, two vertical transfer channels 54 which are adjacent via the channel stop region 53 become high electric potential, although the channel stop region 53 divides them. Since the signal electric charges are accumulated in the vertical transfer channel 54 which is adjacent to the reading part 51c at the reading-out period, the signal charges that can be accumulated in the vertical channel 54 in terms of electric potential will not exceed the electric potential of the channel stop region 53.

FIG. 13A is a timing chart showing driving waveforms imposed on electrodes V1 to V4 consisted of the electrode 56a and the electrode 56b in the conventional solid-state imaging apparatus 51. This timing chart is indicated by peak values of VH, VM and VL. VH is a voltage at the reading-out period, and change in VM and VL relates to the operation in the transfer period. FIG. 13B is a schematic view representing conditions of the electric potentials of the vertical transfer channel 54 and movements of the signal electric charges when the driving waveforms shown in FIG. 13A are imposed. In the drawing, a white square indicates VL, a hatched square indicates VM and a black square indicates VH, and a hatched circle indicates the signal electric charges. The signal electric charges can be accumulated in the vertical transfer channel 54 when VM is imposed, and the vertical transfer channel 54 will be potential barrier when VL is imposed. At a timing t1, the signal electric charges are accumulated in the photoelectric conversion elements 52. At a timing t3, the VH is imposed on reading electrodes V1 and the signal electric charges are moved from the photoelectric conversion elements 52 in every two lines in the vertical direction to the vertical transfer channel 54. At a timing t5, the signal electric charges are moved from the photoelectric conversion elements 52 in the remaining every two lines in vertical direction to the vertical transfer channel 54. At a timing t7, the signal electric charges are accumulated under the electrodes V2 and V3, and the transfer period will start in this condition.

FIG. 14 is an enlarged plan view showing a part enclosed with a double short-dashed line in FIG. 11A. In the drawing, S2 indicates a region of a channel formed by the electrode 56*b* at the reading-out period. An accumulation capacity at the reading-out period is decided approximately by a difference $\phi a$ between the electric potential of the vertical transfer channel 54 that is adjoining to the reading part 51*c* shown in FIG. 12 and the electric potential barrier of the channel stop region 53 and an area of the S2 and a static capacity for the area per unit (the maximum accumulation capacity equals to or approximately equals to $\alpha S2\phi a$, when $\alpha$ is the static capacity for the area per unit).

In a case that this maximum accumulation capacity is smaller than the maximum accumulation capacity of the photoelectric conversion element 52, the signal electric charges flow into an adjacent vertical transfer channel 54*m* over the electric potential barrier of the channel stop region 53, and it causes a blooming phenomenon that will deteriorate an image of a blight part as the solid-state imaging apparatus. That is, the dynamic range will be lost as a reduction of the dealing signal amount. Moreover, this blooming phenomenon is appeared at the timings t3 and t5 in FIG. 13B.

SUMMARY OF THE INVENTION

It is an object of the present invention to provide a solid-state imaging apparatus that can prevent loss in a dynamic range.

Also, it is another object of the present invention is to provide a solid state imaging apparatus that can reduce power consumption while preventing loss in a dynamic range.

According to one aspect of the present invention, there is provided a solid-state imaging apparatus, comprising: a semiconductor substrate defining a two-dimensional surface; a multiplicity of photo electric conversion elements positioned on lattice points of a first lattice of a tetragonal matrix and of a second lattice of which each lattice point is positioned at a center of the first lattice in a light receiving region of the semiconductor substrate; a vertical electric charge transfer device having a plurality of vertical electric charge transfer channels arranged vertically between rows of the photo electric conversion elements and a plurality of transfer electrodes horizontally arranged over the vertical electric charge transfer channels; reading out parts, each comprising a reading out electrode also serving as one of the transfer electrodes, corresponding to each one of the multiplicity of the photo electric conversion elements, and reading out a signal electric charge accumulated in the corresponding photo electric conversion element to the vertical electric charge transfer channels adjoining in a horizontal direction; and a driving device that imposes a first voltage to the reading out electrode for reading out the accumulated signal electric charge from the photo electric conversion elements to the transfer channels in a reading out period and at a same time during the reading out period imposes a second voltage to at least one of the transfer electrodes adjoining to the reading out electrode for each photo electric conversion element for accumulating the signal electric charge in the vertical electric charge transfer channel under the one of the transfer electrode.

The solid-state imaging apparatus according to the present invention can further comprise switching device that switches a first mode for independently outputting a signal electric charge accumulated by each one of the multiplicity of photoelectric conversion elements and a second mode for outputting signal electric charges accumulated by the multiplicity of photoelectric conversion elements after adding the signal electric charges accumulated by at least two of the multiplicity of photoelectric conversion elements, and wherein the driving device imposes the first voltage to the reading out electrode for reading out the accumulated signal electric charge from the photo electric conversion elements to the transfer channels in a reading out period and at a same time during the reading out period imposes the second voltage to at least one of the transfer electrodes adjoining to the reading out electrode for each photo electric conversion element for accumulating the signal electric charge in the vertical electric charge transfer channel under the one of the transfer electrode in the first mode, and the driving device imposes only the first voltage only to the reading out electrode for reading out the accumulated signal electric charge from the photo electric conversion elements to the transfer channels in a reading out period in the second mode.

According to another aspect of the present invention, there is provided a driving method for solid-state imaging apparatus, comprising: a semiconductor substrate defining a two-dimensional surface; a multiplicity of photo electric conversion elements positioned on lattice points of a first lattice of a tetragonal matrix and of a second lattice of which each lattice point is positioned at a center of the first lattice in a light receiving region of the semiconductor substrate; a vertical electric charge transfer device having a plurality of vertical electric charge transfer channels arranged vertically between rows of the photo electric conversion elements and a plurality of transfer electrodes horizontally arranged over the vertical electric charge transfer channels; reading out parts, each comprising a reading out electrode also serving as one of the transfer electrodes, corresponding to each one of the multiplicity of the photo electric conversion elements, and reading out a signal electric charge accumulated in the corresponding photo electric conversion element to the vertical electric charge transfer channels adjoining in a horizontal direction, and the method is characterized by imposing a first voltage to the reading out electrode for reading out the accumulated signal electric charge from the photo electric conversion elements to the transfer channels in a reading out period and at a same time during the reading out period imposing a second voltage to at least one of the transfer electrodes adjoining to the reading out electrode for each photo electric conversion element for accumulating the signal electric charge in the vertical electric charge transfer channel under the one of the transfer electrode.

According to the present invention, a solid-state imaging apparatus that can prevent loss in a dynamic range can be provided.

Moreover, according to the present invention, a solid state imaging apparatus that can reduce power consumption while preventing loss in a dynamic range can be provided.

DETAILED DESCRIPTION OF THE PREFERRED EMBODIMENTS

Figure 1:
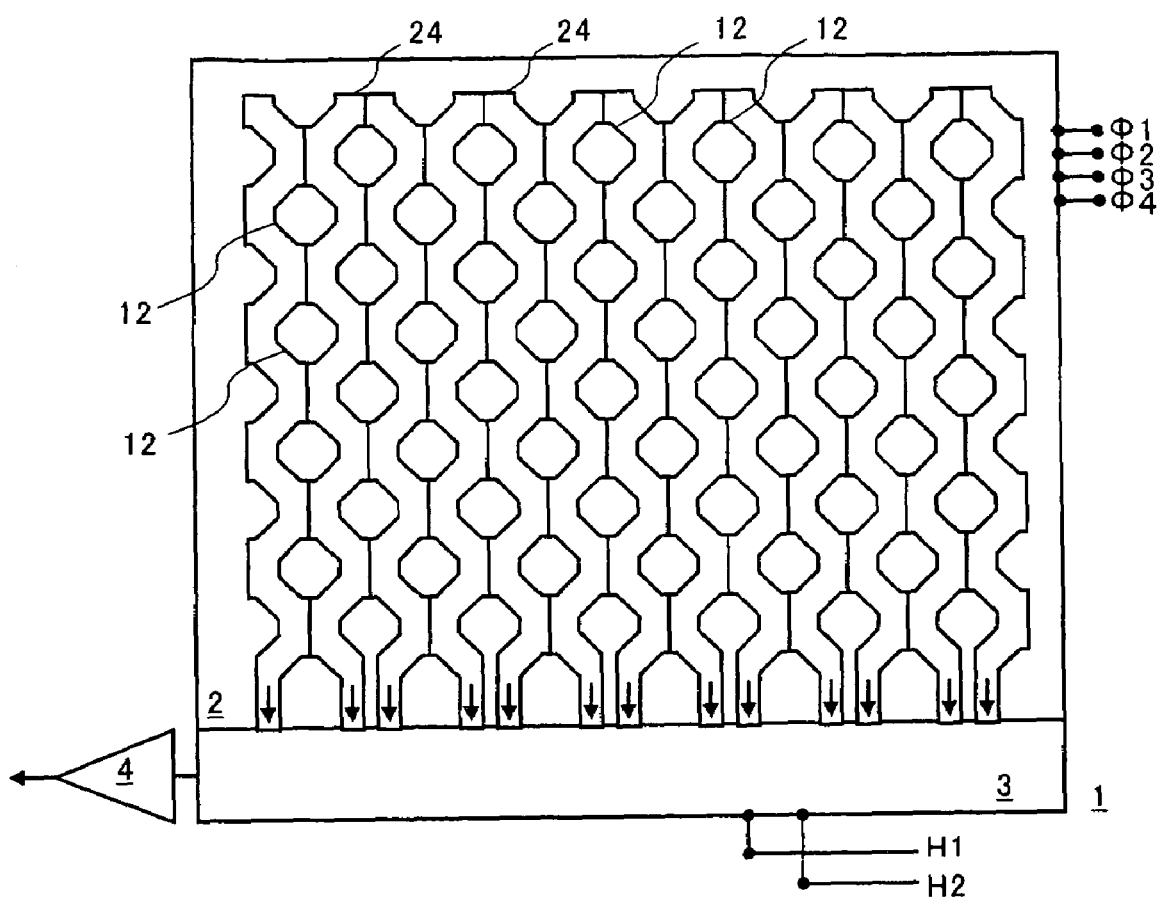
FIG. 1 is a schematic plan view showing a solid-state imaging apparatus 1 according to an embodiment of the present invention.

FIG. 1 is a schematic plan view showing a solid-state imaging apparatus 1 according to an embodiment of the present invention.

The solid-state imaging apparatus 1 is consisted of a light-receiving region 2 including a plurality of photoelectric conversion elements 12 and a vertical signal electric charge transfer device (a vertical charge coupled device: VCCD) 24 transferring the signal electric charges generated by the photoelectric conversion elements 12, a horizontal signal electric charge transfer device (a horizontal charge coupled device: HCCD) 3 transferring the signal electric charges transferred by the VCCD 24 to a horizontal direction and an output amplifier 4.

The light-receiving region 2 is consisted of the plurality of the photoelectric conversion elements 12 by configuring them in the so-called pixel interleaved arrangement or the honey-comb arrangement. The pixel interleaved arrangement used in this specification indicates an arrangement combining the first lattice of a two-dimensional tetragonal matrix and the second lattice of the two-dimensional matrix of which each lattice point is positioned at the center of the first lattice. For example, the photoelectric conversion elements 12 in the even numbered rows (lines) or columns and in the odd numbered rows (lines) or columns are shifted in the horizontal direction by about a half pitch of the photoelectric conversion elements 12, and the photoelectric conversion elements 12 in the even numbered lines (rows or columns) and in the odd numbered lines (rows or columns) are shifted in the vertical direction by about a half pitch of photoelectric conversion elements 12. Each row of the photoelectric conversion elements 12 includes the photoelectric conversion elements 12 in either one of the even numbered rows and in the odd numbered row. Similarly, Each line of the photoelectric conversion elements 12 includes the photoelectric conversion elements 12 in either one of the even numbered lines and in the odd numbered line. The pixel interleaved arrangement is one of the arrangement styles for arranging a multiplicity of the photoelectric conversion elements in a matrix having a plurality of rows and lines.

The phrase "about a half" represents a pitch including an exact half pitch and also a pitch regarded as substantially equal to the half pitch from the performance and image quality although this pitch is different from the exact half pitch because of manufacture tolerances, rounding errors of pixel positions caused from design or manufacturing of a mask or the like.

The vertical electric charge transferring device 24 that reads out the signal electric charges generated by the photoelectric conversion elements 12 and vertically transfers them are formed between columns of the photoelectric conversion elements 12 by vertically traversing between spaces of the photoelectric conversion elements 12. Transfer channels 14 are positioned in the zigzag spaces formed by the pixel interleaved arrangement, and the adjacent transfer channels 14 apart from each other via the photoelectric conversion elements 12 and come closer to each other via the channel stop region 13 (FIG. 2).

Figure 2:
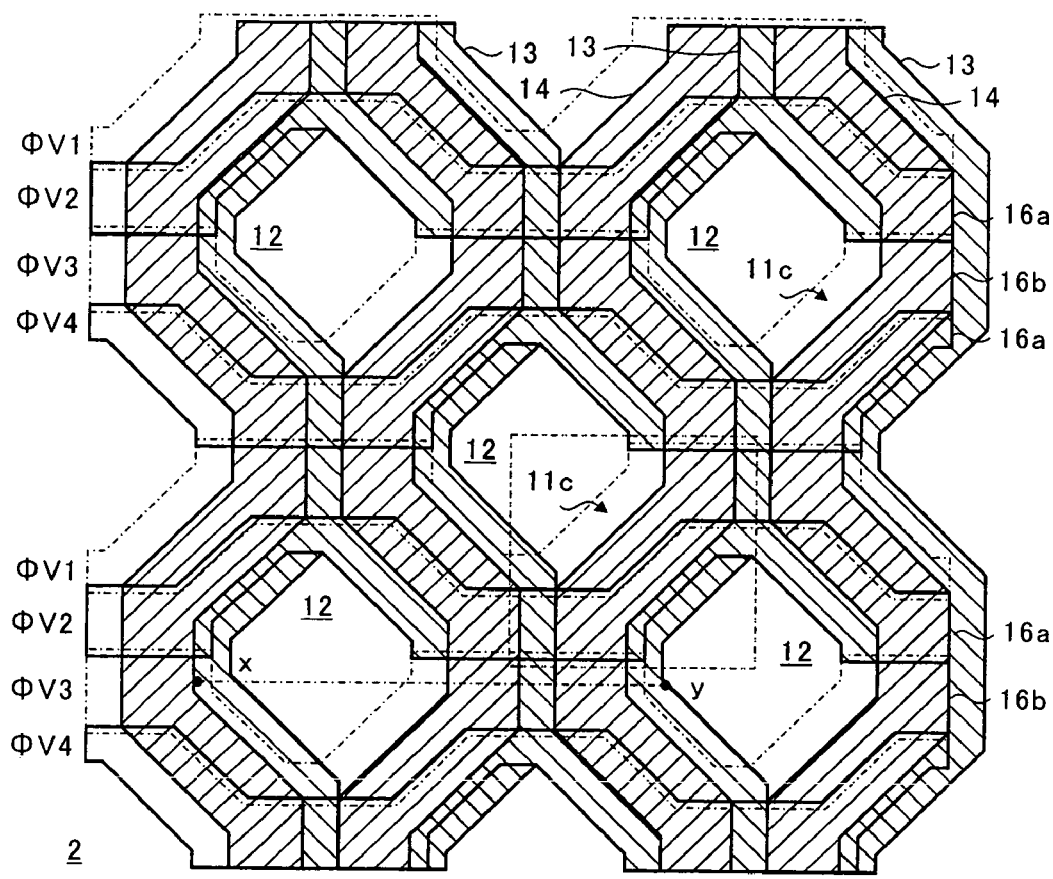
FIG. 2 is an enlarged plan view showing a part of a light-receiving region 2 of the solid-state imaging apparatus 1 according to the first embodiment of the present invention.

The vertical electric charge transfer device 24 is consisted of the vertical transfer channel 14 shown in FIG. 2 and transfer electrodes 16a and 16b (FIG. 2) which are formed over the vertical transfer channel 14 via an insulating film 10a (FIG. 3) and traversing between the photoelectric conversion elements 12 to the horizontal direction.

FIG. 2 is an enlarged plan view showing a part of the light-receiving region 2 of the solid-state imaging apparatus 1 according to the first embodiment of the present invention, and shows a condition wherein the insulating film on the semiconductor substrate is peeled to expose the photoelectric conversion elements 12 and the transfer electrodes 16.

Figure 3:
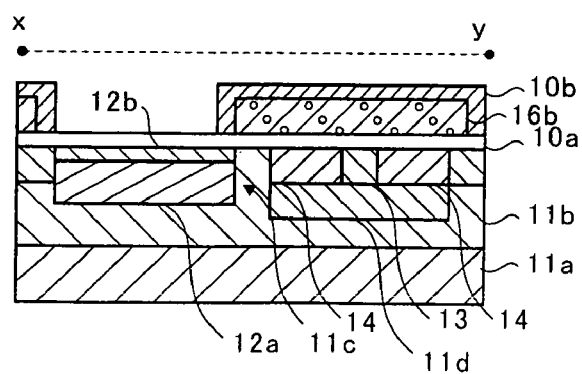
FIG. 3 is an enlarged cross sectional view of the solid-state imaging apparatus according to the first embodiment of the present invention.

FIG. 3 is an enlarged cross sectional view of the solid-state imaging apparatus 1 according to the first embodiment of the present invention. Moreover, this cross section shows the solid-state imaging apparatus cut across a single short-dashed line x-y in FIG. 2.

In the below-described explanation, in order to distinguish the degrees of impurity concentrations between impurity added regions having the same conductive type, it is transcribed as a p⁻-type impurity added region, a p-type impurity added region and a p⁺-type impurity added region, or an n⁻-type impurity added region, an n-type impurity added region and an n⁺-type impurity added region in sequence from the region that has relatively low in the impurity concentration. Except for a case that the p⁻-type impurity added region 11b is formed by the epitaxial growing method, it is preferable that all the impurity added regions are formed by ion-implantation and a thermal treatment after that.

The semiconductor substrate 11 has, for example, an n⁻-type silicon substrate 11a and the p⁻-type impurity added region 11b formed in a surface of the substrate 11. The p⁻-type impurity added region 11b is formed by the thermal treatment after the ion-implantation of p-type impurity on one surface of the n⁻-type silicon substrate 11a, or performing the epitaxial growth of silicon containing p-type impurity on one surface of the n-type silicon substrate 11a.

Next, an n-type impurity added region (vertical transfer channels) 14 are formed in the p-type impurity added region 11b having a width of, for example, 0.5 μm corresponding to one row of the photoelectric conversion elements 12 formed in the later process. Each of the vertical transfer channels 14 has flat impurity concentration in a longitudinal (vertical) direction, and extends along with the corresponding row of the photoelectric conversion elements 12.

Next, a channel stop region 13 is formed adjoining to the vertical transfer channel 14 (on an opposite side of a reading gate channel region 11c). The channel stop region 13 is formed of, for example, p⁺-type impurity added region, trench isolation or local oxidation (LOCOS).

A part of the p-type impurity added region 11c is remained along with the right side of each photoelectric conversion element 12 (n-type impurity added region 12a) formed in the later process. Each p-type impurity added region 11c is used as a channel region 11c for the reading gate.

Next, an oxide film (or an ONO film) 15 is formed on the surface of the semiconductor substrate 11. The ONO film is composed by a lamination layer formed by laminating, for example, a silicon oxide film (thermal oxidation film) with thickness of about 20 to 70 nm, a silicon nitride film with thickness of about 30 to 80 nm and a silicon oxide film with thickness of about 10 to 50 nm in this order. In FIG. 2, the oxide film 15 is represented with one layer for convenience of the explanation. Moreover, the above described oxide film 15 can also be formed with single oxide film ($SiO_2$).

Next, an electrode forming process is executed. In this process, a transfer electrode (multilayered poly-silicon electrode) 16 is formed on the oxide film 15. The first polycrystalline Si layer 16a is laminated with thickness of 0.2 μm to 3 μm (for example, 1 μm) on the oxide film 15 formed on the surface of the semiconductor substrate 1, and a photo-resist film is applied on a surface of the first polycrystalline Si layer 16a. Then, after patterning the photo-resist film to a predetermined pattern by photolithography (exposure and development), by using the patterned photo-resist film as a mask, the first polycrystalline layer 16a in an unmasked region (a region without the mask) is etched off by dry-etching (using chlorine-type gas) with strong anisotropy (high velocity of etching in vertical direction to the mask). By that, the first poly-silicon electrode 16a is formed.

Next, the Si surface is oxidized, and a $SiO_2$ film (the second oxide film) is formed on the first poly-silicon electrode 16a with thickness of 300 Å to 1000 Å. Moreover, the second polycrystalline Si layer 16b is laminated on the second oxide film with thickness of 0.2μ to 3 μm (for example, 1 μm) by using reducing CVD method or the like. Then, the patterning of the second polycrystalline Si layer 16b is performed by using the photolithography, and the second layer poly-silicon electrode 16b is formed. Moreover, at the cross section of this part, only the second layer poly-silicon electrode 16b is positioned over the vertical transfer channel 14. Also, two vertical transfer channels 14 are adjacent via the channel stop region 13.

Next, predetermined points of the p-type impurity added regions 11b are converted to the n-type impurity added region 12a by ion implantation. Moreover, the n-type impurity added region 12a functions as an electric charge accumulation region. By converting the surface layer part of the n-type impurity added region 12a to the p⁺-type impurity added region 12b by ion implantation, a photoelectric conversion element 12 that is buried-type photo-diode is formed.

Next, an insulating film 10 is formed to cover the multi-layer poly-silicon electrodes 16 and a front surface of the silicon substrate 11, and a light shielding film (not shown in the drawing) is formed by laminating alloy consisted of two or more than two types of metals such as tungsten, aluminum, chrome, titan, molybdenum and the like by PVD or CVD. This light shielding film covers each transfer electrode 16 or the like and prevent unnecessary photoelectric conversion in a region other than the photoelectric conversion element 12. The light shielding film has one opening over each of the photoelectric conversion element 12. Moreover, a passivation layer, a planarizing insulating layer, a color filter layer, the second planarizing film and micro lenses are formed on the light shielding film.

The driving method of the solid-state imaging apparatus 1 according to the first embodiment of the present invention is explained in the below.

Figure 4A:
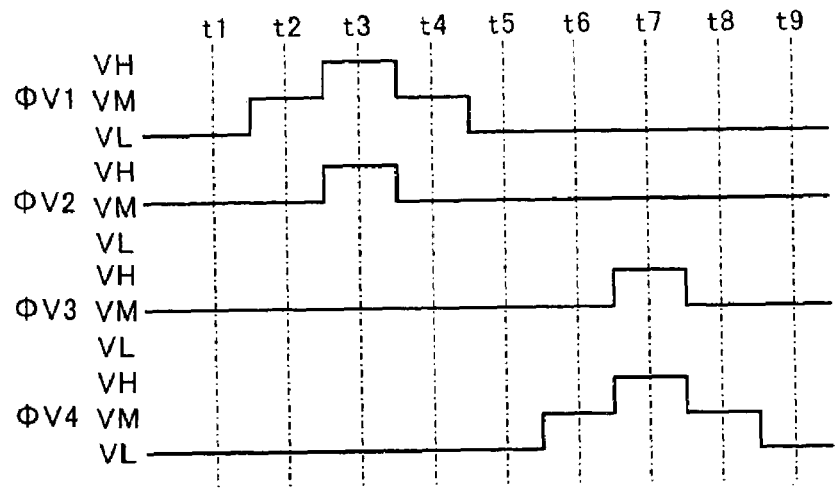
FIG. 4A is a timing chart showing a driving waveform.
Figure 4B:
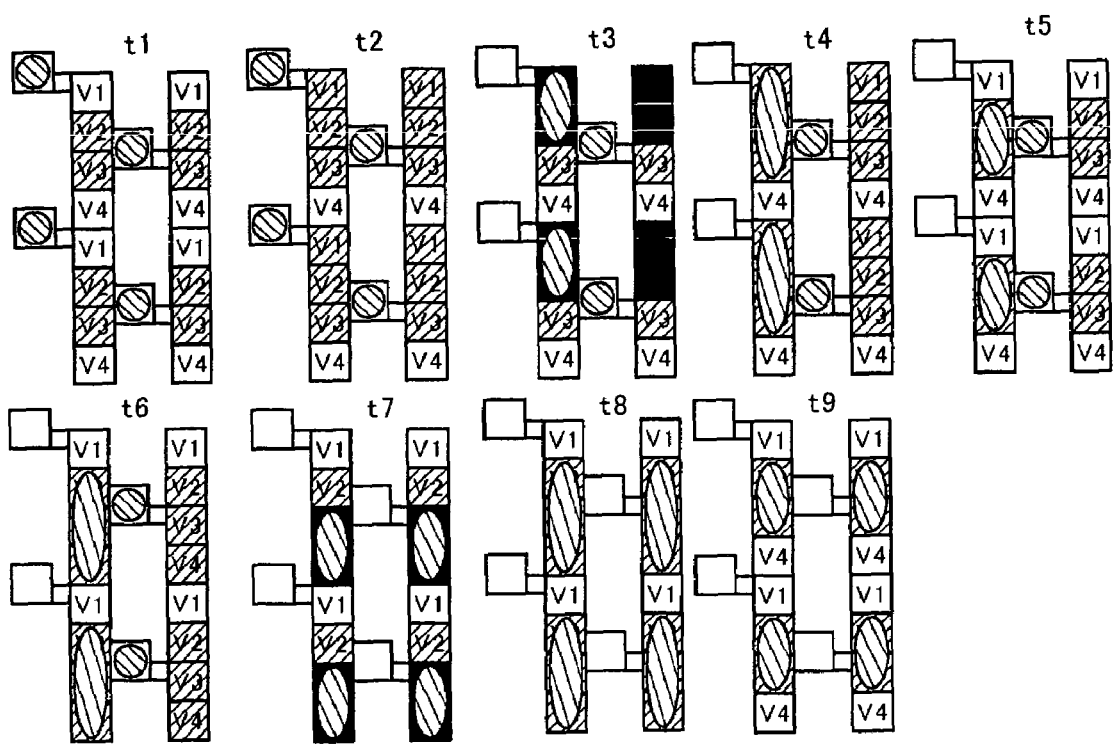
FIG. 4B is a schematic view showing changes in the electric potentials of the vertical transfer channel 14 and movements of the signal electric charges in the vertical transfer channel 14 according to the first embodiment of the present invention.

FIG. 4A is a timing chart showing driving waveforms imposed on the electrodes V1 to V4 that are consisted of the electrodes 16a and 16b of the solid-state imaging apparatus 1. This timing chart is depicted by peak values of VH, VM and VL. VH is a voltage at the reading out period, and changed in VM and VL relates to the movement at the transfer period. FIG. 4B is a schematic view showing changes in the electric potentials of the vertical transfer channel 14 and movements of the signal electric charges in the vertical transfer channel 14 when the driving waveforms shown in FIG. 4A are imposed. In the drawing, a white square indicates VL, a hatched square indicates VM and a black square indicates VH, and a hatched circle indicates the signal electric charges. The signal electric charges can be accumulated in the vertical transfer channel 14 when VM is imposed, and the vertical transfer channel 14 will be potential barrier when VL is imposed.

At timing t1, the signal electric charges are accumulated in the photoelectric conversion elements 12. At timing t3, VH is imposed on the reading electrodes of the V2 at the same time when VH is imposed on the reading electrodes of the V1, and the signal electric charges move from the photoelectric conversion elements 12 in every two lines in the vertical direction to the vertical transfer channel 14. At timing t7, VH is imposed on the reading electrodes of the V3 at the same time when VH is imposed on the reading electrodes of the V4, and the signal electric charges move from the photoelectric conversion elements 12 in the remaining every two lines in the vertical direction to the vertical transfer channel 14. At timing t9, it becomes a condition that the signal electric charges are accumulated under the V2 and V3, and the condition shifts to the transfer period. Moreover, the voltage imposed on the V3 at timing t7 may not be limited to VH, but also may be a voltage that can at least accumulate the signal charges under the V3.

Figure 5:
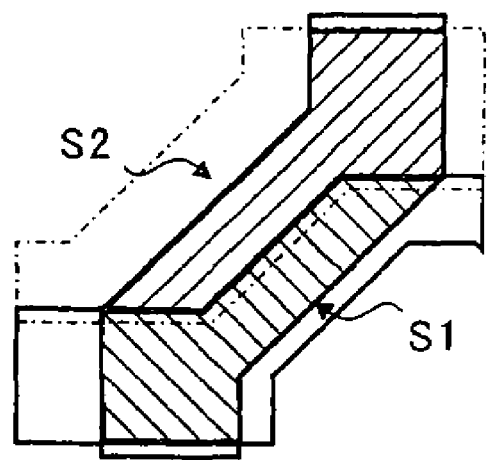
FIG. 5 is an enlarged plan view showing a part enclosed with a double short-dashed line in FIG. 2.

FIG. 5 is an enlarged plan view showing a part enclosed with a double short-dashed line in FIG. 2. In the drawing, S1 indicates a channel region to be formed by the electrode 16a at the reading out period, and S2 indicates a channel region to be formed by the electrode 16b at the reading out period.

In the first embodiment of the present invention, a plain area of the channel composing the maximum accumulation capacity shown in FIG. 5 will be S1+S2 at a part where the vertical transfer channels 14 adjoin by imposing VH on each of the electrodes V1, V2, V3 and V4 at timing t3 and t7. Comparing to the conventional solid-state imaging apparatus 51, the maximum accumulation capacity of the vertical transfer channel 14 at the reading out period can be about doubled. Therefore, the damage in the dynamic range of the solid-state imaging apparatus 1 can be prevented.

In the above-described first embodiment, the VH pulse is imposed on two electrodes in order to secure the sufficient dynamic range, however; influence of increasing in the power consumption is less in the still picture imaging mode because the flame rate is low. However; since the flame rate increases in the motion picture imaging mode than that in the still picture imaging mode, the number of imposing time of the VH pulse per unit period will increase. Therefore, the influence of the increase in the power consumption by imposing the VH pulse on two electrodes becomes significant in the motion picture imaging mode. A driving method of the solid state imaging apparatus that controls the influence of the increase in the power consumption in this motion picture mode as less as possible is explained in the below as a modified example that the solid state imaging apparatus 1 according to the above-described first embodiment is driven by the motion picture mode.

In the modified example of the first embodiment, the solid state imaging apparatus 1 having the same hardware structure as the first embodiment is used, and only the driving method is changed. Moreover, the motion picture mode in this specification includes a case not only a normal motion picture imaging but also imaging the motion picture for monitor screen display, that is, the term includes a case wherein continuous ten to several tens flames for one second are imaged. Moreover, a case that the signal electric charges are output independently (without addition) is defined as the still picture mode regardless of distinction of the still picture and the motion picture, and a case the plurality of the signal electric charge are added to output (pixel addition) is defined as the motion picture mode.

Figure 6:
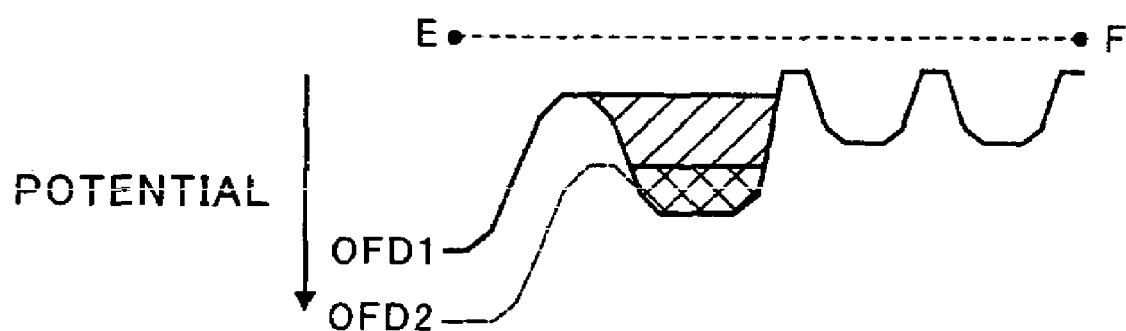
FIG. 6 shows an electric potential between a broken line E-F in FIG. 11B in a still picture mode and a motion picture mode.
Figure 11A:
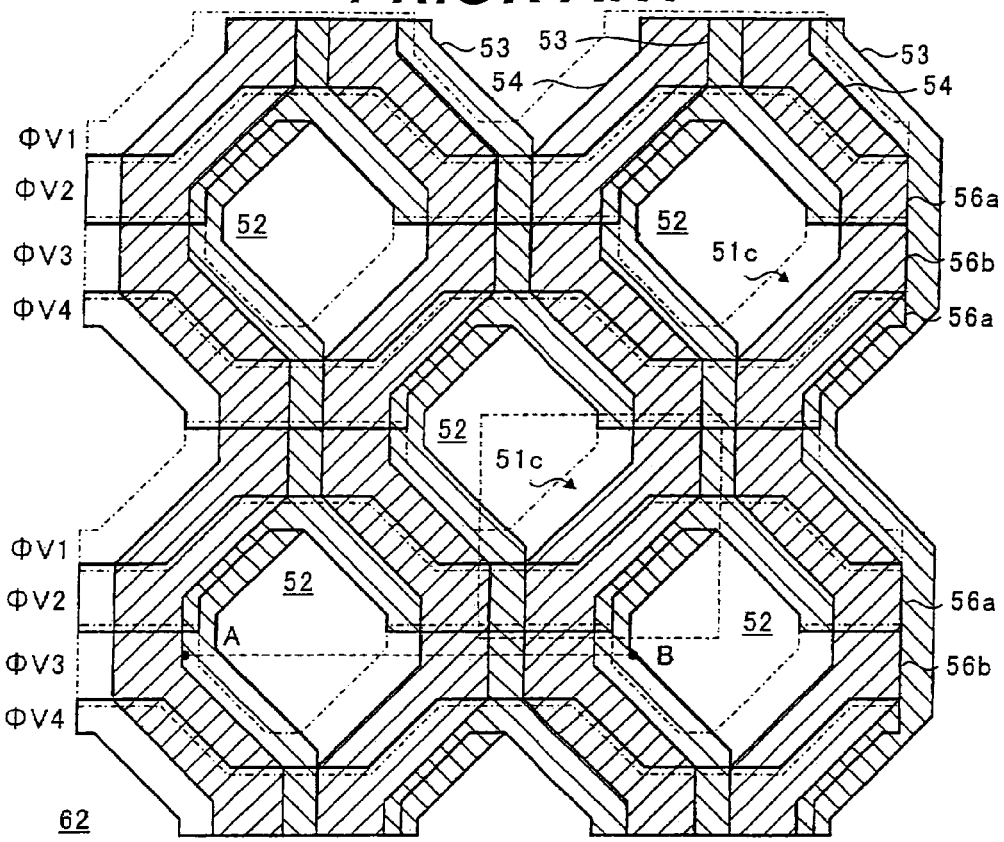
FIG. 11A is an enlarged plan view of the conventional solid-state imaging apparatus 51.
Figure 11B:
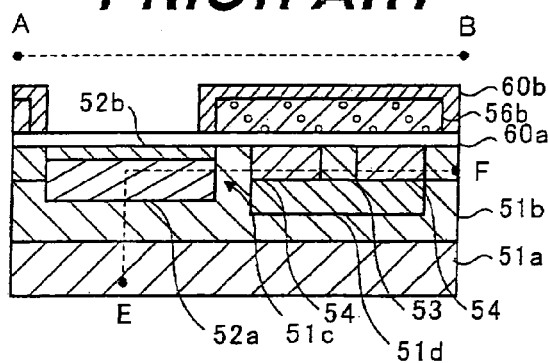
FIG. 11B is an enlarged cross sectional view showing a part of the light-receiving region 62 of the conventional solid-state imaging apparatus 51.
Figure 12:
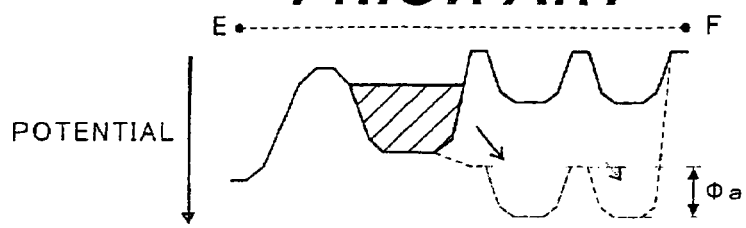
FIG. 12 shows an electric potential between a broken line E-F in FIG. 11B.
Figure 13A:
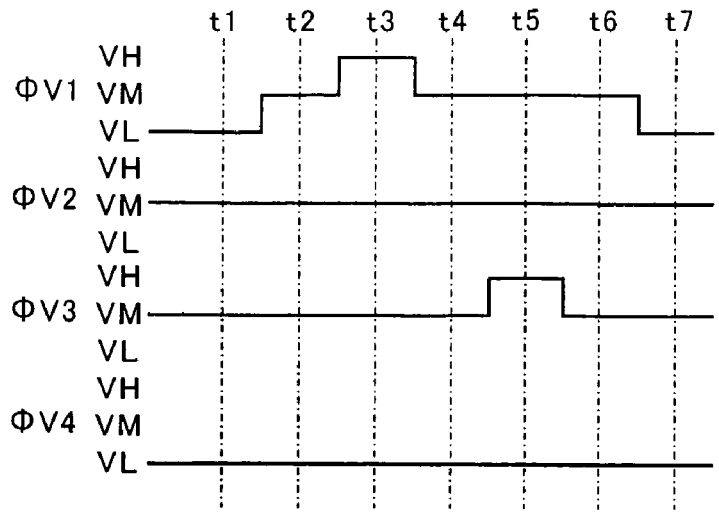
FIG. 13A is a timing chart showing a driving waveform.
Figure 13B:
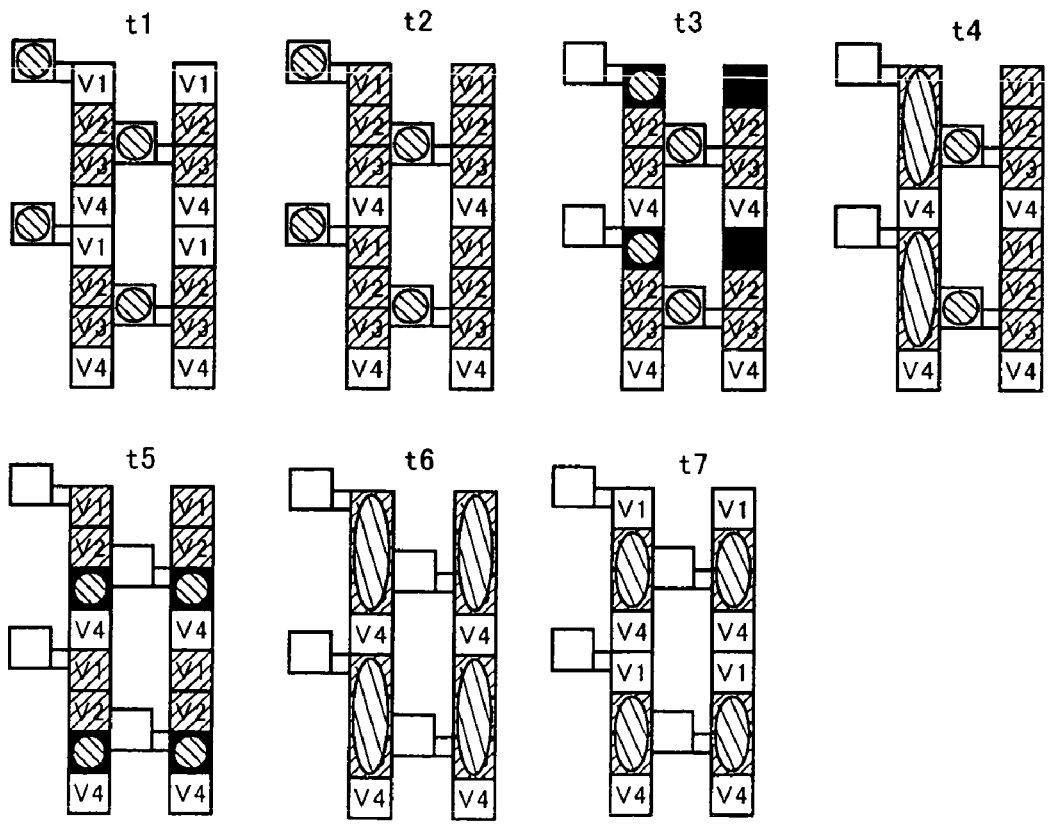
FIG. 13B is a schematic view changes in the electric potentials of the vertical transfer channel 54 and movements of the signal electric charges in the vertical transfer channel 54 according to the conventional embodiment.
Figure 14:
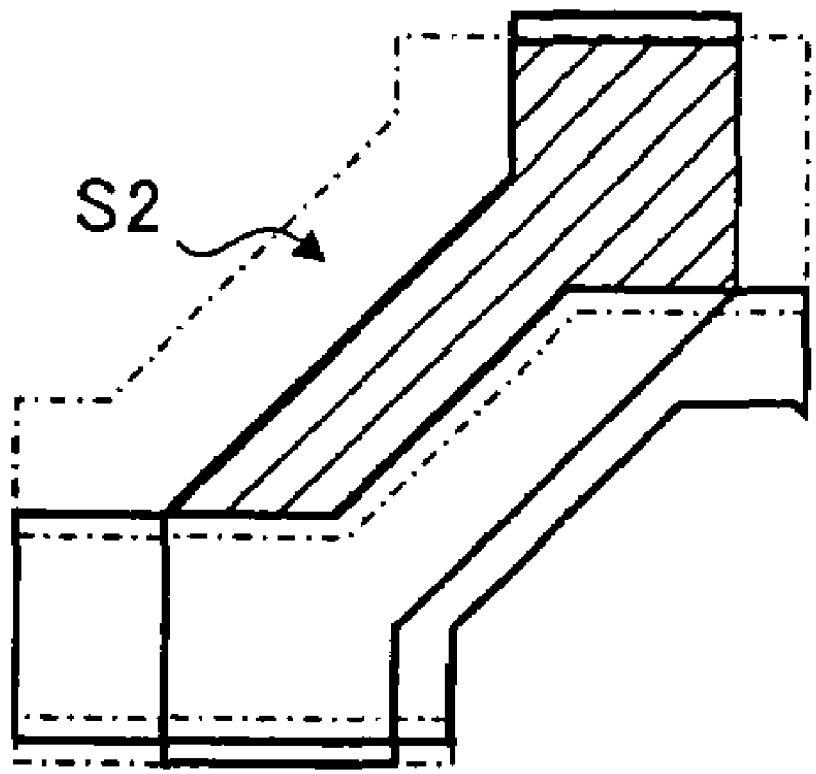
FIG. 14 is an enlarged plan view showing a part enclosed with a double short-dashed line in FIG. 11A.

FIG. 6 shows an electric potential between a broken line E-F in FIG. 11B in a still picture mode and a motion picture mode.

As described in the above as the conventional technique, since the signal electric charges are accumulated in the vertical transfer channel 54 adjacent to the reading part 51c at the time of reading, the signal electric charges which can be accumulated in the vertical transfer channel 54 do not potentially exceed the electric potential of the channel stop region 53. Therefore, in the structure shown in FIG. 2, the maximum accumulation capacity of the photoelectric conversion elements 12 does not exceed the electric potential of the $p^-$-type impurity added region 11b that positioned between the photodiode and the substrate. Since the electric potential of the $p^-$-type impurity added region 11b can be controlled with a substrate bias voltage (OFD voltage), the maximum accumulation capacity of the photoelectric conversion elements 12 can be controlled with the OFD voltage. Normally, the voltage indicated by the OFD 1 in the drawing is imposed in the still picture imaging mode (still picture mode) as the first embodiment, and the voltage indicated by the OFD2 (OFD2>OFD1) is imposed in the motion picture imaging mode (motion picture mode). This is for appropriately reducing the amount of the signal electric charge accumulation of the photoelectric conversion elements 12 in order not to exceed signal electric charge amount of the transfer circuit (vertical transfer channel 14) when the pixel addition is executed for improving the flame rate.

Figure 7A:
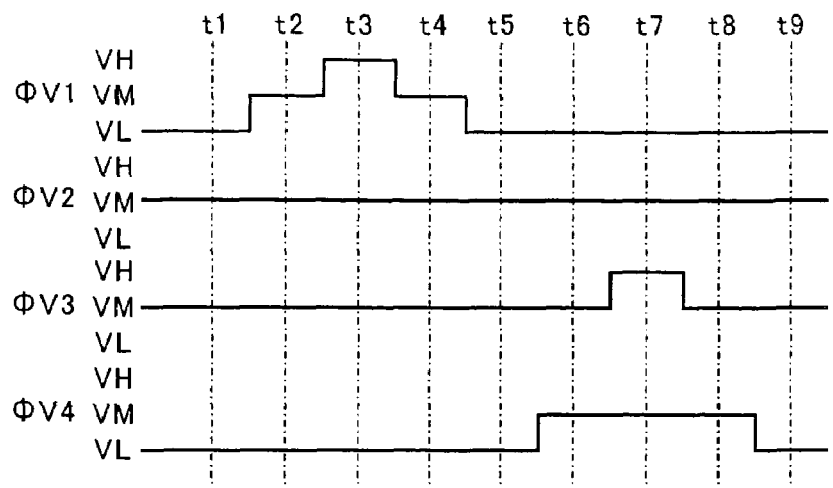
FIG. 7A is a timing chart showing a driving waveform.
Figure 7B:
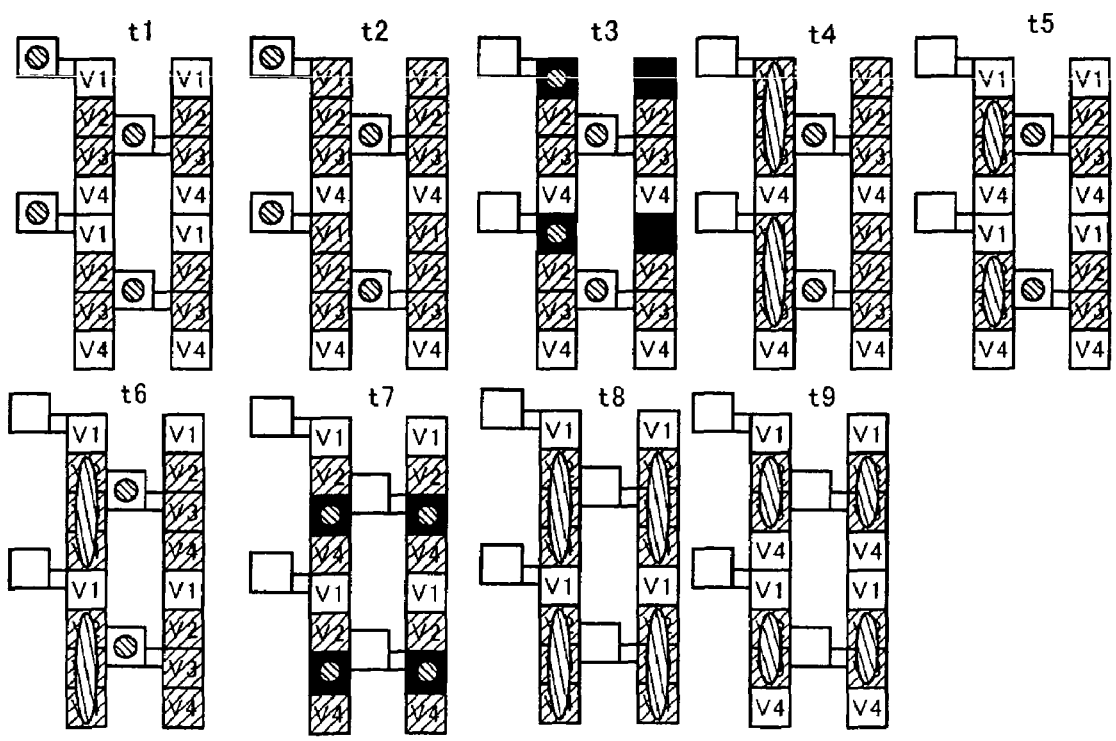
FIG. 7B is a schematic view showing changes in the electric potentials of the vertical transfer channel 14 and movements of the signal electric charges in the vertical transfer channel 14 according to a modified example of the first embodiment of the present invention.

FIG. 7A and FIG. 7B are a timing chart showing driving waveforms and a schematic view showing changes in the electric potentials of the vertical transfer channel 14 and movements of the signal electric charges in the vertical transfer channel 14 according to the modified example (motion picture mode) of the first embodiment of the present invention. FIG. 7A is a timing chart showing driving waveforms imposed on the electrodes V1 to V4 that are consisted of the electrodes 16a and 16b of the solid-state imaging apparatus 1 according to the modified example of the first embodiment. This timing chart is depicted by peak values of VH, VM and VL. VH is a voltage at the reading out period, and changed in VM and VL relates to the movement at the transfer period. FIG. 7B is a schematic view showing changes in the electric potentials of the vertical transfer channel 14 and movements of the signal electric charges in the vertical transfer channel 14 when the driving waveforms shown in FIG. 7A are imposed. In the drawing, a white square indicates VL, a hatched square indicates VM and a black square indicates VH, and a hatched circle indicates the signal electric charges. The signal electric charges can be accumulated in the vertical transfer channel 14 when VM is imposed, and the vertical transfer channel 14 will be potential barrier when VL is imposed.

At timing t1, the signal electric charges are accumulated in the photoelectric conversion elements 12. At timing t3, VH is imposed only on the reading electrodes of the V1, and the signal electric charges move from the photoelectric conversion elements 12 in every two lines in the vertical direction to the vertical transfer channel 14. At timing t7, VH is imposed only on the reading electrodes of the V4, and the signal electric charges move from the photoelectric conversion elements 12 in the remaining every two lines in the vertical direction to the vertical transfer channel 14. At timing t9, it becomes a condition that the signal electric charges are accumulated under the V2 and V3, and the condition shifts to the transfer period.

In the motion picture mode, since an amount of the signal electric charges read from the photoelectric conversion elements 12 to the vertical transfer channel 14 is small, the dynamic range is secured by imposing the VH pulse on one electrode (V1 or V3) as described in the above. Also, since the number of the electrodes to which the VH pulse is imposed will be a half of that in the still picture more (the first embodiment), the influence of the increase in the power consumption by the motion picture imaging can be reduced.

As described in the above, capacity of a vertical shift-resistor at the reading time appropriate for each mode can be maintained by switching the first embodiment as the still picture mode and the modified example as the motion picture mode, so that the power consumption can be decreased.

Figure 8:
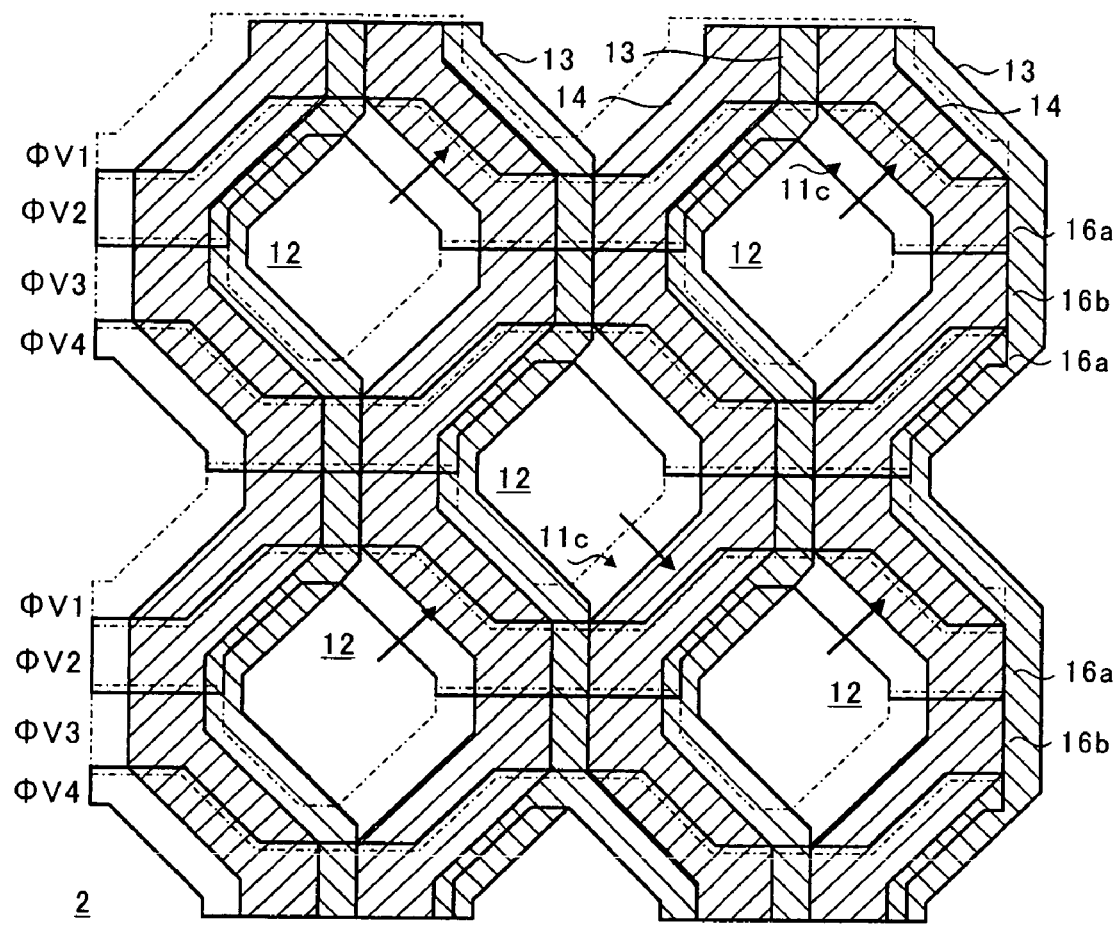
FIG. 8 is an enlarged plan view showing a part of a light-receiving region 2 of the solid-state imaging apparatus 1 according to a second embodiment of the present invention.

FIG. 8 is an enlarged plan view showing a part of a light-receiving region 2 of the solid-state imaging apparatus 1 according to the second embodiment of the present invention. The insulating film on the semiconductor substrate is peeled, and a condition exposing the photoelectric conversion elements 12 and the transfer electrodes 16 is shown in the drawing. Structural difference from the first embodiment of the present invention is a point that the reading part 11c is composed of 2 electrodes adjacent to the photoelectric conversion element 12. Other components of the second embodiment are the same as those in the first embodiment; therefore the explanation of the same components will be omitted.

A driving method of the solid-state imaging apparatus 1 according to the second embodiment of the present invention is explained in the below.

Figure 9A:
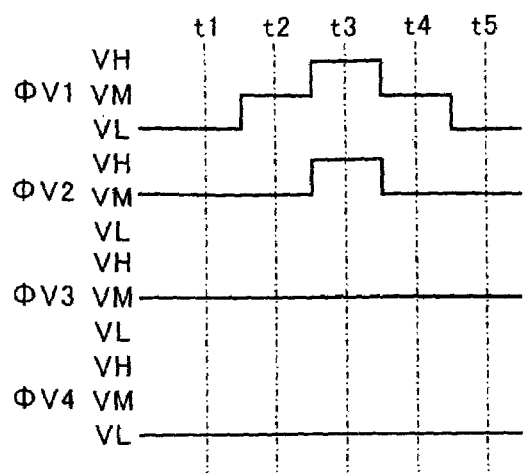
FIG. 9A is a timing chart showing a driving waveform.
Figure 9B:
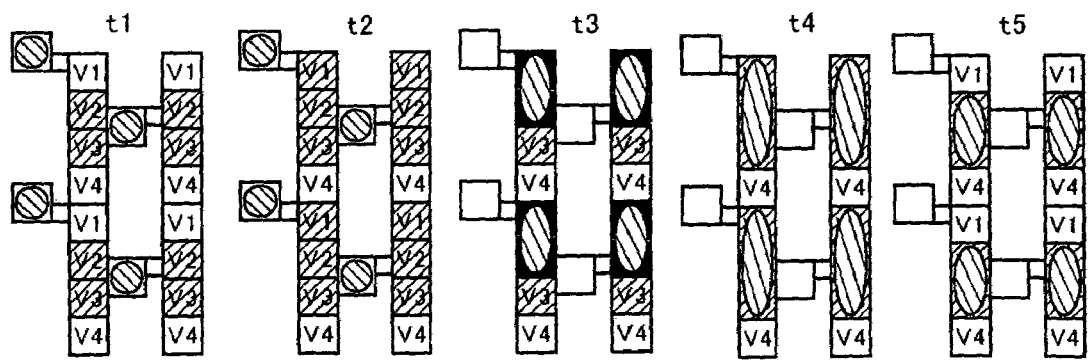
FIG. 9B is a schematic view showing changes in the electric potentials of the vertical transfer channel 14 and movements of the signal electric charges in the vertical transfer channel 14 according to the second embodiment of the present invention.
Figure 10:
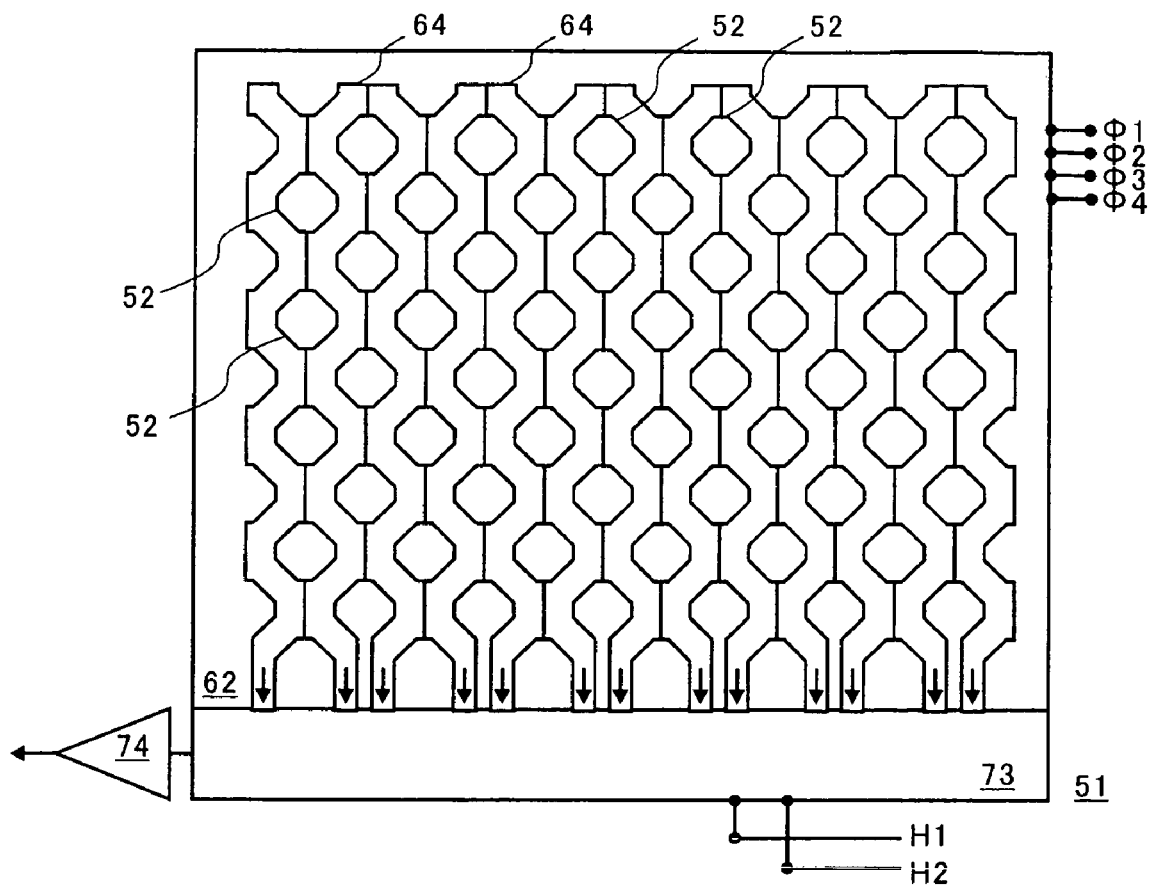
FIG. 10 is a schematic view showing a conventional solid-state imaging apparatus 51.

FIG. 9A is a timing chart showing a driving waveform imposed on the electrodes V1 to V4 that are consisted of the electrodes 16a and 16b of the solid-state imaging apparatus 1. This timing chart is depicted by peak values of VH, VM and VL. VH is a voltage at the reading out period, and changed in VM and VL relates to the movement at the transfer period. FIG. 9B is a schematic view showing changes in the electric potentials of the vertical transfer channel 14 and movements of the signal electric charges in the vertical transfer channel 14 when the driving waveforms shown in FIG. 9A are imposed. In the drawing, a white square indicates VL, a hatched square indicates VM and a black square indicates VH, and a hatched circle indicates the signal electric charges. The signal electric charges can be accumulated in the vertical transfer channel 14 when VM is imposed, and the vertical transfer channel 14 will be potential barrier when VL is imposed.

At timing t1, the signal electric charges are accumulated in the photoelectric conversion elements 12. At timing t3, VH is imposed on the reading electrodes of the V2 at the same time when VH is imposed on the reading electrodes of the V1, and the signal electric charges move from the photoelectric conversion elements 12 in all rows to the vertical transfer channel 14. At timing t5, it becomes a condition that the signal electric charges are accumulated under the V2 and V3, and the condition shifts to the transfer period.

In the second embodiment of the present invention, by reading out the electric charges as described in the above, it will be unnecessary to impose VH on all of the φV1 to φV4, and a necessary number of a three-level driver to impose the voltage VH at the reading out period will be half comparing to the conventional technique. Therefore, cost reduction and low electricity consumption can be realized by reducing the three-level driver.

Moreover, the electric charges in all the pixels can be read out at the same time in the reading out period. Therefore, difference in an accumulation time of the signal electric charge between the rows of the pixels when it is desired to obtain signal electric charges in a shot accumulation time by fully depleting the photoelectric conversion elements 12 by impressing a high voltage to the n-type substrate 11a at the reading out period. For example, when a color arrangement differs in every row for obtain color signals, so-called difference in white balance wherein a color signal ratio is different between a short time accumulation and a long time accumulation can be prevented.

Moreover, in the second embodiment, damage in a dynamic range of the solid-state imaging apparatus 1 can be prevented by multiplying the area of the channel that is the maximum accumulation capacity as same as the first embodiment of the present invention.

Moreover, as same as the modified example of the first embodiment, in the second embodiment, the number of the electrodes to which the VH pulse is imposed is reduced to a half of the still picture mode (the second embodiment) by imposing the VH pulse only to one electrode (V1), and the influence of the increase in the power consumption by the motion picture imaging will be decreased.

Moreover, the above-described embodiment has been explained with the four-phase (φV1 to φV4) driving method; however, the same effect can be obtained by the well-known eight-phase driving method or the six-phase driving method.

The present invention has been described in connection with the preferred embodiments. The invention is not limited only to the above embodiments. It is apparent that various modifications, improvements, combinations, and the like can be made by those skilled in the art.

What are claimed are:

1. A solid-state imaging apparatus, comprising:
    a semiconductor substrate defining a two-dimensional surface;
    a multiplicity of photo electric conversion elements positioned on lattice points of a first lattice of a tetragonal matrix and of a second lattice of which each lattice point is positioned at a center of the first lattice in a light receiving region of the semiconductor substrate;
    a vertical electric charge transfer device having a plurality of vertical electric charge transfer channels arranged vertically between rows of the photo electric conversion elements and a plurality of transfer electrodes horizontally arranged over the vertical electric charge transfer channels;
    reading out parts, each comprising a reading out electrode also serving as one of the transfer electrodes, corresponding to each one of the multiplicity of the photo electric conversion elements, and reading out a signal electric charge accumulated in the corresponding photo electric conversion element to the vertical electric charge transfer channels adjoining in a horizontal direction;
    a driving device that imposes a first voltage to the reading out electrode for reading out the accumulated signal electric charge from the photo electric conversion elements to the transfer channels in a reading out period and at a same time during the reading out period imposes a second voltage to at least one of the transfer electrodes adjoining to the reading out electrode for each photo electric conversion element for accumulating the signal electric charge in the vertical electric charge transfer channel under the one of the transfer electrode;
    a switching device that switches a first mode for independently outputting a signal electric charge accumulated by each one of the multiplicity of photoelectric conversion elements and a second mode for outputting signal electric charges accumulated by the multiplicity of photoelectric conversion elements after adding the signal electric charges accumulated by at least two of the multiplicity of photoelectric conversion elements, and wherein
    the driving device imposes the first voltage to the reading out electrode for reading out the accumulated signal electric charge from the photo electric conversion elements to the transfer channels in a reading out period and at a same time during the reading out period imposes the second voltage to at least one of the transfer electrodes adjoining to the reading out electrode for each photo electric conversion element for accumulating the signal electric charge in the vertical electric charge transfer channel under the one of the transfer electrode in the first mode, and the driving device imposes only the first voltage only to the reading out electrode for reading out the accumulated signal electric charge from the photo electric conversion elements to the transfer channels in a reading out period in the second mode.

2. The solid-state imaging apparatus according to claim 1, wherein each of said reading out electrode on which the first voltage is imposed and said at least one of the transfer electrodes on which the second voltage is imposed is included in the reading part for the photo electric conversion element in the row of the photo electric conversion elements different from one another.

3. The solid-state imaging apparatus according to claim 1, wherein said reading out electrode on which the first voltage is imposed and said at least one of the transfer electrodes on which the second voltage is imposed are adjoining to same photo electric conversion element.

4. A driving method for solid-state imaging apparatus, comprising:
   a semiconductor substrate defining a two-dimensional surface;
   a multiplicity of photo electric conversion elements positioned on lattice points of a first lattice of a tetragonal matrix and of a second lattice of which each lattice point is positioned at a center of the first lattice in a light receiving region of the semiconductor substrate;
   a vertical electric charge transfer device having a plurality of vertical electric charge transfer channels arranged vertically between rows of the photo electric conversion elements and a plurality of transfer electrodes horizontally arranged over the vertical electric charge transfer channels;
   reading out parts, each comprising a reading out electrode also serving as one of the transfer electrodes, corresponding to each one of the multiplicity of the photo electric conversion elements, and reading out a signal electric charge accumulated in the corresponding photo electric conversion element to the vertical electric charge transfer channels adjoining in a horizontal direction,
   the method is characterized by imposing a first voltage to the reading out electrode for reading out the accumulated signal electric charge from the photo electric conversion elements to the transfer channels in a reading out period and at a same time during the reading out period imposing a second voltage to at least one of the transfer electrodes adjoining to the reading out electrode for each photo electric conversion element for accumulating the signal electric charge in the vertical electric charge transfer channel under the one of the transfer electrode,
   imposing the first voltage to the reading out electrode for reading out the accumulated signal electric charge from the photo electric conversion elements to the transfer channels in a reading out period and at a same time during the reading out period imposing the second voltage to at least one of the transfer electrodes adjoining to the reading out electrode for each photo electric conversion element for accumulating the signal electric charge in the vertical electric charge transfer channel under the one of the transfer electrode in a first mode for independently outputting a signal electric charge accumulated by each one of the multiplicity of photoelectric conversion elements, and
   imposing only the first voltage only to the reading out electrode for reading out the accumulated signal electric charge from the photo electric conversion elements to the transfer channels in a reading out period in a second mode for outputting signal electric charges accumulated by the multiplicity of photoelectric conversion elements after adding the signal electric charges accumulated by at least two of the multiplicity of photoelectric conversion elements.

5. The driving method for solid-state imaging apparatus according to claim 4, wherein each of said reading out electrode on which the first voltage is imposed and said at least one of the transfer electrodes on which the second voltage is imposed is included in the reading part for the photo electric conversion element in the row of the photo electric conversion elements different from one another.

6. The driving method for solid-state imaging apparatus according to claim 4, wherein said reading out electrode on which the first voltage is imposed and said at least one of the transfer electrodes on which the second voltage is imposed are adjoining to same photo electric conversion element.

* * * * *